United States Patent [19]
Page

[11] Patent Number: 4,852,324
[45] Date of Patent: Aug. 1, 1989

[54] VARIABLE ANGLE REFRACTORY ANCHOR FOR CONNECTING SURFACES

[75] Inventor: Gary L. Page, Ponca City, Okla.
[73] Assignee: Conoco Inc., Ponca City, Okla.
[21] Appl. No.: 278,697
[22] Filed: Dec. 1, 1988
[51] Int. Cl.⁴ .......................... E04B 1/80; E04B 1/24
[52] U.S. Cl. ........................................ 52/506; 52/378; 52/509; 52/582; 110/336; 110/339; 403/295; 403/403; 411/469
[58] Field of Search .................. 52/71, 239, 506, 508, 52/509, 513, 378, 379, 582, 583; 110/331–340; 403/170, 171, 176, 295, 403; 411/457–460, 469

[56] References Cited
U.S. PATENT DOCUMENTS

| 2,840,017 | 6/1958 | Wolf | 110/339 |
| 3,213,811 | 10/1965 | Cullinan | 110/339 |
| 3,242,889 | 3/1966 | Thomas, Sr. | 110/339 |
| 4,479,337 | 10/1984 | Crowley . | |
| 4,581,867 | 4/1986 | Crowley | 52/378 |
| 4,753,053 | 6/1988 | Heard | 52/378 X |
| 4,761,922 | 8/1988 | Black | 52/239 X |

Primary Examiner—David A. Scherbel
Assistant Examiner—Richard E. Chilcot, Jr.

[57] ABSTRACT

A refractory support device comprising two elongated members pivotally connected at one end and adapted to be attached to shaped connecting surfaces, and an insulated structure comprising connecting surfaces having the support devices attached thereto and having refractory material covering the surfaces and surrounding the support devices.

9 Claims, 1 Drawing Sheet

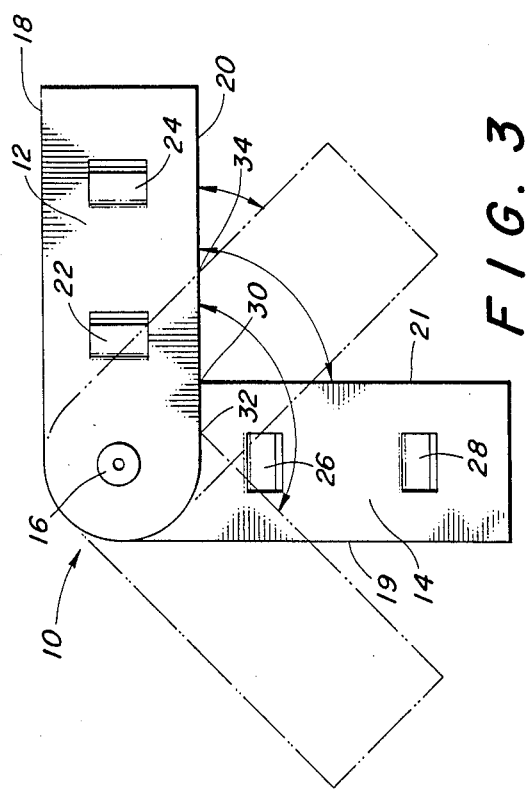
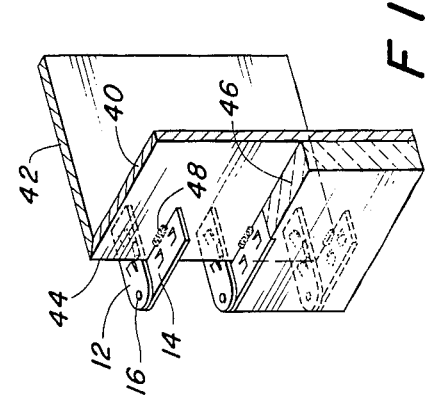
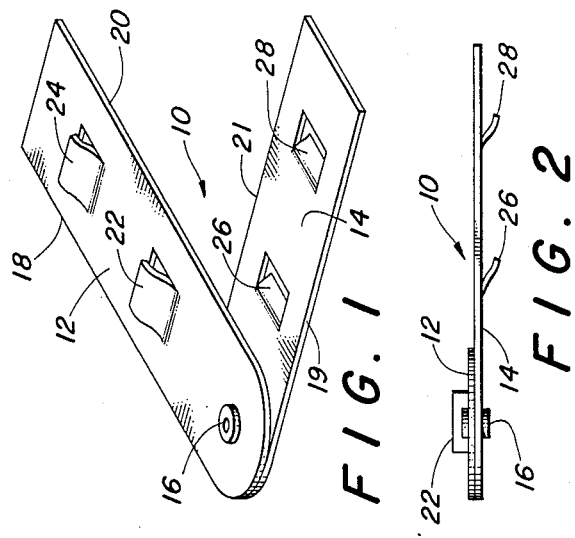
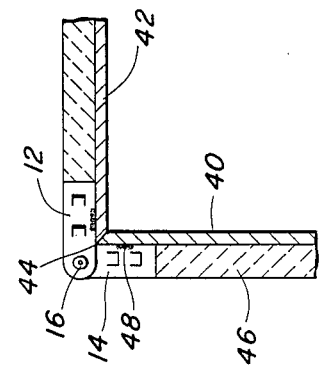

VARIABLE ANGLE REFRACTORY ANCHOR FOR CONNECTING SURFACES

BACKGROUND OF THE INVENTION

1. Field of the Invention

This invention relates to refractory support devices and to refractory lined structures, and more particularly to refractory support devices for supporting a refractory liner at the intersection of two refractory lined surfaces, and to structures utilizing the support devices.

Refractory liners have been used for many years in process vessels, reactors, conduits, furnaces and the like to provide thermal insulation, and in environments such as fluidized catalytic reactors or regenerators or stacks, to provide resistance to abrasion or erosion. Such liners can serve not only to thermally insulate surfaces but also to prolong their service life by shielding them from erosion by abrasion. In fluid catalytic cracking units for petroleum hydrocarbons, quite high fluid velocities which may be on the order of 50 to 70 ft/second occur, and the abrasive effect of entrained cracking catalyst is very pronounced. Moreover, high temperatures are involved. For example, in the regenerator the temperature of gases exiting through the cyclones may be on the order of 1250°-1350° F. and in the reactor the temperature may be 800°-900° F. Accordingly, the usual practice has been to line all vessels, conduits and cyclone separators through which fluid with entrained catalyst flows with refractory liner to prevent erosion of the metal surfaces and to provide thermal insulation. To retain the refractory, which may be a refractory cement, a concrete cement-aggregate mixture, or a reinforced cement or concrete, various anchoring arrangements have been employed. Some of the presently utilized anchoring arrangements work quite well on the main surfaces of the liners, but there have been problems with the portion of the liner adjacent the edge formed by two intersecting surfaces, particularly when the surfaces intersect at varying angles along the edge, as is common in certain process equipment.

2. The Prior Art

Several approaches to anchoring refractory liners to surfaces have been used with varying degrees of success, including anchor tabs, welded studs, open mesh material, etc., but none of these approaches has been very satisfactory for anchoring the refractory at the intersecting edge where two surfaces join, particularly when the surfaces join at an angle that varies along the edge.

SUMMARY OF THE INVENTION

According to the present invention, an edge anchor tab or support device is provided that is easy to install even on edges formed by surfaces which intersect at varying angles. These support devices enable the formation of a uniform refractory lining around the connecting edge, and provide excellent support to a portion of the liner that heretofore has been difficult to effectively support.

The anchor according to the invention comprises a pair of elongated members pivotally connected at one end and being adapted for attachment to the connecting edge of a pair of intersecting surfaces. When a series of anchors is attached to the connecting edge of the surfaces, refractory can then be applied over the surfaces as well as over the connecting edge and the attached anchors, and the resulting structure has improved service life due to the improved support provided by the anchors at the connecting edge.

THE DRAWINGS

FIGS. 1 and 2 are a perspective view and a side view, respectively, of a support device in accordance with the invention.

FIG. 3 is a plan view of the support device, showing in phantom line the device pivoted to angles other than a right angle.

FIG. 4 is a cross sectional view of an insulated structure showing the support device positioned in accordance with the invention.

FIG. 5 is a perspective view, partially cut away, showing a series of support devices along the connecting edge of refractory lined intersecting surfaces.

DESCRIPTION OF THE PREFERRED EMBODIMENTS

A refractory support device in accordance with a preferred embodiment of the invention is illustrated in detail in FIGS. 1, 2 and 3. Support device 10 includes elongated members 12 and 14 pivotally connected to each other at one end by rivet 16. The connected ends of elongated numbers 12 and 14 are arcuate in shape, shown as semi-circular with a radius of one half the width of members 12 and 14 such that the overlapping portion of the ends forms an arc having a radius also equal to one half the width of members 12 and 14. Arcuate ends having a larger or smaller radius could be used, but would not provide the desired smooth corner when covered with refractory insulation.

Elongated member 12 has straight parallel sides 18 and 20, and member 14 has straight parallel sides 19 and 21 for ease of attachment to a surface and to provide a uniformly thick refractory layer when surrounded by refractory.

Elongated member 12 is shown with a pair of refractory holding tabs 22 and 24, and member 14 has tabs 26 and 28. These tabs are preferably formed from the elongated members by stamping or the like, and extend outward from the device so as not to interfere with pivoting of the elongated members. The tabs provide significant refractory holding, and the holes resulting from tab formation also provide a holding effect when filled with refractory. As seen in FIG. 3, the support device can fit a right angle connecting edge or an acute or obtuse angle connecting edge, depending on the particular structure being insulated. Note that when a right angle intersection is being insulated, the edge would be positioned at point 30 along side 20 of member 12, while the edge of an obtuse angle intersection would be positioned at point 32 on side 20, and for an acute angle would be positioned at point 34 along side 20. Thus, when the support device is placed in contact with two surfaces and the connecting edge is positioned adjacent both members 12 and 14, there is no need to calculate the amount of extension of one or both elongated members beyond the connected edge as would be the case if unconnected members were used. This is particularly useful when the connecting angle varies along the edge to be insulated.

The use of the supporting devices, and a structure utilizing them, are illustrated in FIGS. 4 and 5. A pair of metal surfaces 40 and 42 joined at intersecting edge 44 are covered with a layer of refractory insulation 46. Supporting devices 10 are connected to surfaces 40 and 42 by welds 48, with edge 44 positioned at the intersection of sides 20 and 21 of members 12 and 14 respectively. As seen in FIG. 5, a series of support devices 10 is positioned along edge 44, and refractory layer 46 preferably covers the full width of members 12 and 14 to provide a uniform layer. The refractory can be squeegeed over the support devices to provide a uniform layer and a smooth corner.

In a structure where the intersecting surfces join at other than a right angle, or at an angle that varies along the edge, the support devices can be quickly attached to the surfaces without the need for individual measurement and/or positioning of individual elongated members, as the pivoting connection assures that the device is properly positioned when placed against the intersecting surfaces with the intersecting edge in contact with sides 20 and 21 of members 12 and 14.

Variations within the scope of the invention will be apparent to those skilled in the art. The length and width of the elongated member, the number and shape of tabs, the material of construction, etc. can be selected to suit the particular installation, and need not be exactly as shown and described. Such variations are intended to be a part of the invention, which is to be defined by the appended claims.

I claim:
1. A variable angle refractory anchor comprising:
   (a) a first flag elongated member having straight sides and an arcuate end:
   (b) a second flat elongated member having straight sides and an arcuate end;
   (c) connecting means pivotally joining the arcuate ends of said first and second members, said connecting means being located a distance inward from said arcuate ends equal to the radius of curvature of said arcuate ends; and
   (d) each of said elongated members including at least one tab formed therein; and each of said tabs extending away from on another.
2. The device of claim 1 wherein each of said members has a plurality of tabs extending away from one another.
3. The device of claim 2 wherein said connecting means is a rivet.
4. The device of claim 3 wherein said arcuate ends are semi-circular with a radius of one half the width of said elongated members.
5. A refractory insulated structure comprising:
   (a) first and second surface members joined at a common edge;
   (b) a refractory support device having a pair elongated members, said members having an arcuate end and being pivotally joined at said arcuate ends, said elongated members having straight sides with one side of each elongated member attached to one of said surface members with said common edge being positioned in contact with each of said elongated members; and
   (c) a layer of refractory material on both of said surface members substantially surrounding said refractory support device.
6. The structure of claim 5 wherein said surfaces join at a right angle.
7. The structure of claim 5 wherein said surfaces join at an acute angle.
8. The structure of claim 5 wherein said surfaces join at an obtuse angle.
9. The structure of claim 5 wherein said surfaces join at varying angles along said edge, and a plurality of said support devices are spaced along said edge.

* * * * *